Jan. 30, 1968    W. R. MILLER ETAL    3,366,873
LINEAR RESPONSIVE MOLTEN METAL LEVEL DETECTOR
Filed Sept. 15, 1966    2 Sheets-Sheet 1

INVENTORS.
William R. Miller
Louis H. Thacker
BY

ATTORNEY.

Jan. 30, 1968 W. R. MILLER ETAL 3,366,873
LINEAR RESPONSIVE MOLTEN METAL LEVEL DETECTOR
Filed Sept. 15, 1966 2 Sheets-Sheet 2

INVENTORS.
William R. Miller
Louis H. Thacker
BY

ATTORNEY.

3,366,873
LINEAR RESPONSIVE MOLTEN METAL LEVEL DETECTOR
William R. Miller, Concord, and Louis H. Thacker, Knoxville, Tenn., assignors to the United States of America as represented by the United States Atomic Energy Commission
Filed Sept. 15, 1966, Ser. No. 580,155
3 Claims. (Cl. 324—40)

ABSTRACT OF THE DISCLOSURE

The level of a molten metal is monitored external to a non-magnetic containment vessel therefor by three elongated, rectangular, stacked coils mounted on the vessel and having the axis thereof oriented perpendicular to the direction of movement of the molten metal. The difference in the voltages induced in the innermost and outermost coils by the suitably energized center coil, due to the relative proximity of the coils to the conducting molten metal, will provide a linear and accurate output signal indicative of the level of the molten metal within the vessel.

---

The invention described herein was made in the course of, or under, a contract with the U.S. Atomic Energy Commission.

In the prior art, molten metal level detectors have generally consisted of the resistive type or float type which were enclosed in the molten metal containment vessel. The high temperatures and corrosive environments normally encountered in such molten metal systems seriously limit the service life and reliability of these conventional molten metal level detectors. Inductive-type detectors coupled with a servo-system have also been utilized to monitor molten metal liquid levels external to a containment vessel. These detectors, utilizing two coils, usually monitor and follow the movement of the upper surface of a molten metal by use of a suitable servo-system. Such a system is inherently subject to inaccuracies due to mechanically moving components and possible servo error voltages. The use of three coils in axial alignment has been utilized to detect fluid flow and/or to detect when a fluid level reaches a given point, with the axis of the sensor unit aligned with the direction of movement of the conducting fluid. Such detectors have not been used to detect and measure liquid levels.

There exists a need for a detector for measuring the level of a molten metal, wherein the level sensing means of the detector can be mounted external to the molten metal containment vessel and in a fixed position to provide a signal that is precise and accurate as to the level of the molten metal.

With a knowledge of the limitations of prior devices and the above need, it is the object of the present invention to provide a molten metal level detector which will meet the above need.

This and other objects and advantages of the present invention will become apparent upon a consideration of the following detailed specification and the accompanying drawings, wherein.

The above object has been accomplished in the present invention by providing a sensor having three stacked coils which are rectangular in shape and having a high ratio of length to width. The axis of the stacked coil sensor is oriented perpendicular to the direction of movement of the conducting liquid and the sensor is fixedly mounted exterior of a containment vessel for the conducting liquid. The intermediate coil is preferably energized to induce a voltage in each of the other two coils, and the difference in the induced voltages in these other coils, due to their relative proximity to the conducting liquid, will vary as the liquid level varies in the vicinity of the sensor to provide an output signal which is substantially linear and, when fed through appropriate instrumentation, will provide an accurate measure of the liquid level because of the above-mentioned high ratio of length to width of the rectangular coils of the sensor.

Figure 1:
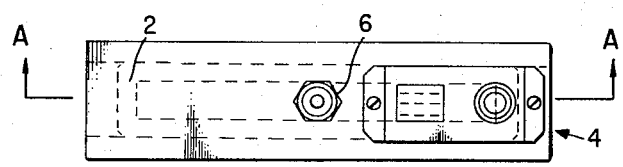
FIG. 1 is a top view of the molten metal level sensing means of the detecting and measuring system of the present invention.
Figure 1A:
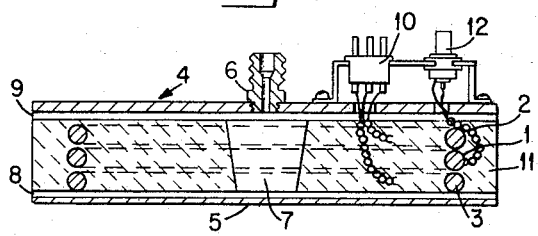
FIG. 1A is a sectional view along the line A—A of FIG. 1 of the level sensing means.
Figure 2:
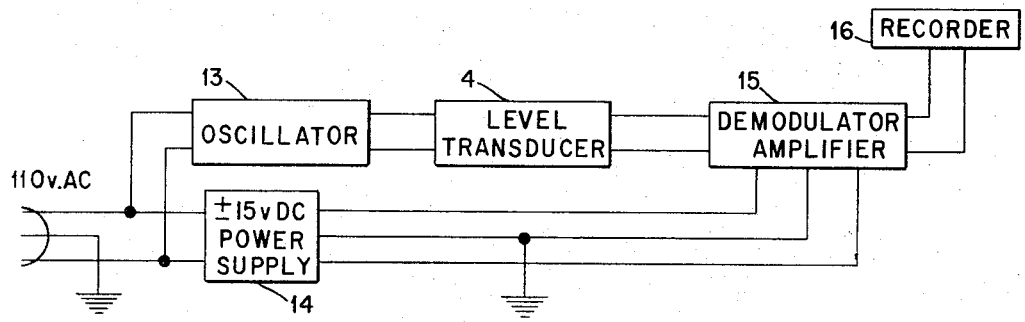
FIG. 2 is a schematic block diagram of the level detector system of the present invention.

With reference to the drawings, the details of the liquid level transducer 4, utilized in the system of FIG. 2, are illustrated in FIG. 1, wherein the transducer 4 comprises three rectangular coils 1, 2, 3 in stacked relationship, and having a high ratio of length to width which provides a substantially linear response from the transducer for detecting the level of a conducting fluid in a manner to be described below. The level transducer 4 was designed to monitor molten metal levels over a range of 6 inches. This range can be varied by changing the length of the sensing coils. Each of the coils 1, 2, and 3 is wound on a 7/16″ x 6⅝″ x ¼″ form, and each coil contains 500 turns of wire, for example.

The coils 1, 2, and 3 are embedded in Araldite potting compound 11, for example, and are enclosed in a suitable housing 5. A cooling air inlet fitting 6 is provided for supplying cooling air from a source, not shown, into a cooling air plenum 7 and into cooling air channels 8 and 9. A connector 12 is provided for connecting a suitable source of alternating current of appropriate frequency to the center coil 1, such a source, 13, being shown in FIG. 2. The coils 2 and 3 are connected in series opposition and the difference signal therebetween is connected by way of a signal connector 10 to a phase sensitive demodulator amplifier 15, as shown in FIG. 2.

In FIG. 2, a 110-volt A.C. source is connected to the oscillator 13 for supplying the excitation to the coil 1 of the transducer 4 of FIG. 1, as mentioned above. The 110-volt A.C. source is also connected to a transformer, rectifier, and filter network 14 to provide a ±15-volt D.C. power supply for the demodulator amplifier 15. The difference output of the coils 2 and 3 of the transducer 4 is connected to the demodulator amplifier 15, as mentioned above. The output of the unit 15 is connected to a suitable recorder 16 which is calibrated to provide an indication of the level of a conducting fluid as detected by the transducer 4.

Figure 4:
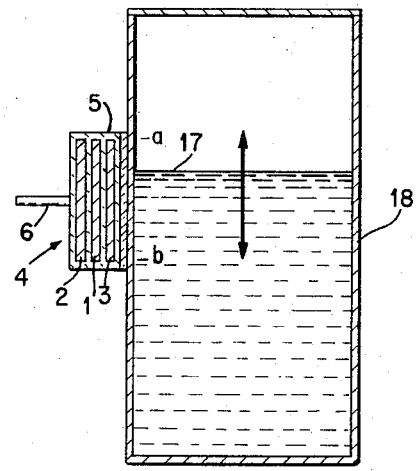
FIG. 4 is a sectional view of the level sensing means and its mounted position on a typical molten metal containment vessel for sensing the molten metal level thereof.

The transducer 4 of FIG. 1 as used in the system of FIG. 2 is positioned exterior of a suitable liquid containment vessel 18, as in FIG. 4, such that the axis of the transducer unit is oriented perpendicular to the direction of movement of the conducting liquid in the vessel 18, the liquid having a level 17 which may vary and such variation detected by the transducer 4. The level 17 of the molten metal liquid in vessel 18 can be measured accurately between points *a* and *b*, the range within which the present level detector responds linearly to changes in liquid level. If it is desirable to monitor the level of the liquid over a greater range, the length of coils 1, 2, and 3 must be extended to cover the increased distance to provide a linear response over the increased range.

When the level 17 of the conducting fluid is between the points *a* and *b* in FIG. 4, the voltage induced in each of coils 2 and 3 by the primary winding of coil 1 will be different due to the reaction with the eddy currents produced in the conducting fluid in vessel 18. Coil 3, being positioned adjacent to the conducting fluid, will be affected by the eddy currents to a greater degree than will coil 2 which is positioned farther away from the liquid. As mentioned above, the winding of coil 1 of the transducer 4 is excited by an alternating current of appropriate frequency by the oscillator unit 13 of FIG. 2. The difference signal between coils 2 and 3 is demodulated, filtered, and amplified by the unit 15 and recorded on a conventional D.C. millivolt recorder 16.

Figure 3:
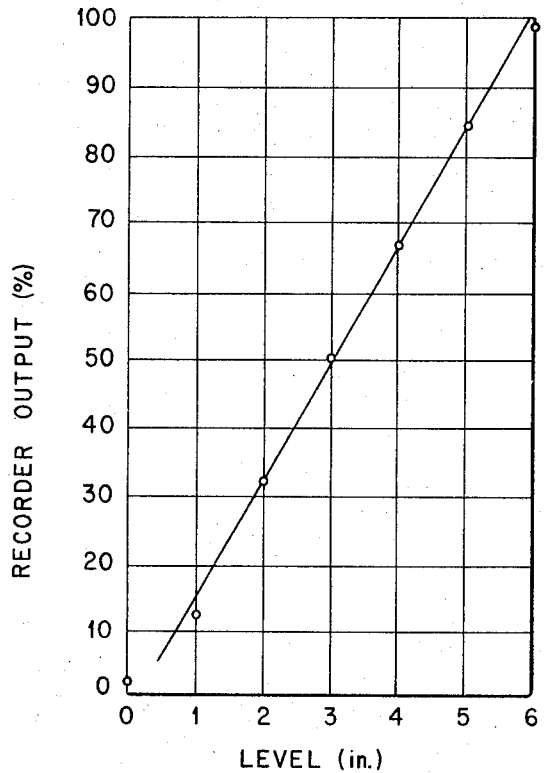
FIG. 3 is a graph illustrating a typical response curve of the results obtained utilizing the system of FIG. 2.

The transducer detector 4 can precisely monitor molten metal levels through ½ inch of stainless steel containment and an additional ¼ to ½ inch of thermal insulation. A typical response curve is shown in FIG. 3 and shows a deviation from linearity less than 1% except at the extreme ends of the range. Thus, it should be evident that the above-described device provides for a level detector system for indicating the level of a conducting liquid contained in a non-magnetic vessel, wherein the level sensor of the system is mounted exterior to the vessel and contains no moving parts while at the same time providing an output signal that is accurate and substantially linear over a given range as determined by the length of the rectangular coils utilized in the sensor.

The level detector system, described above, is not limited for use for detecting the level of molten metal, but is also suitable for use in detecting the level of any conducting material through non-magnetic walls. The primary requirement in any such system is that the conductivity of the material being monitored must be high relative to the conductivity of the ambient above such material.

This invention has been described by way of illustration rather than by way of limitation and it should be apparent that it is equally applicable in fields other than those described.

What is claimed is:

1. A device for detecting the level of a conducting liquid in a non-magnetic, liquid containment vessel comprising a detector housing mounted external and adjacent to said vessel; three coaxially superposed rectangular coils mounted within said housing, the axis of said coils being perpendicular to the direction of movement of said liquid within said vessel, said coils having a high ratio of length to width with the length extending along the direction of movement of said liquid; a source of alternating current having a selected frequency and being connected to the center coil of said three coils, said center coil inducing a voltage in each of the other two coils on each side of said center coil, said two induced voltages in said other coils not being precisely equal due to the different eddy current effect of said liquid on said coils due to the position of each in relation to said liquid; and means for connecting the outputs of said two other coils in series opposition to provide a difference output therefrom which is indicative of the level of said conducting liquid within said vessel.

2. The level detector set forth in claim 1, wherein said conducting liquid is molten metal.

3. The level detector set forth in claim 2, and further including a phase sensitive demodulator; means for connecting said difference output from said other two coils to said demodulator; and means for filtering, amplifying, and recording the output of said demodulator, said recorder providing an indication linearly proportional to the level of said molten metal within said vessel in a range determined by the length of said coils.

References Cited

UNITED STATES PATENTS

| | | | |
|---|---|---|---|
| 2,994,034 | 7/61 | Kinzer | 324—41 |
| 3,220,258 | 11/65 | Rod | 340—244 |

FOREIGN PATENTS

| | | |
|---|---|---|
| 153,278 | 4/52 | Australia. |

RUDOLPH V. ROLINEC, *Primary Examiner.*

R. J. CORCORAN, *Assistant Examiner.*